SELF-ENERGIZING SEAL

Filed Aug. 27, 1968 4 Sheets-Sheet 1

INVENTOR.
RENIC P. VINCENT
BY Paul F. Hawley
ATTORNEY

SELF-ENERGIZING SEAL

Filed Aug. 27, 1968 4 Sheets-Sheet 2

INVENTOR.
RENIC P. VINCENT

BY Paul F. Hawley

ATTORNEY

INVENTOR.
RENIC P. VINCENT
BY Paul F. Hawley
ATTORNEY

INVENTOR.
RENIC P. VINCENT
BY Paul F. Hawley
ATTORNEY

United States Patent Office 3,524,653
Patented Aug. 18, 1970

3,524,653
SELF-ENERGIZING SEAL

Renic P. Vincent, Tulsa, Okla., assignor to Pan American Petroleum Corporation, Tulsa, Okla., a corporation of Delaware Filed Aug. 27, 1968, Ser. No. 755,546
Int. Cl. F16j *15/16;* F16r *41/00*
U.S. Cl. 277—27 11 Claims

ABSTRACT OF THE DISCLOSURE

A self-energizing seal is made by providing a flexible sealing member, preferably of an elastomer, the inner part of which fits the body to which the seal is made and the outer part receives pressure in a radial direction equal to that of the liquid to be sealed, the region between inner and outer parts being made of cylindrical orthotropic material stiffer in the radial direction than in the circumferential direction. A suitable housing is provided to enclose the sealing member. Means are provided for effecting the radial presssure, for example by allowing the fluid to be sealed to act hydraulically in a chamber between the housing and the outer part of the seal.

This arrangement provides pressure multiplication so that the pressure exerted by the inner part of the sealing member against the sealing surface exceeds that of the fluid to be sealed.

BACKGROUND OF THE INVENTION

Field of the invention

This invention was developed to provide a more effective self-energizing seal for the slip joint of riser pipe assemblies than has been available in the past. However, it has quite wide application, as will be seen from perusal of this specification.

In drilling wells from a floating structure, such as a vessel, it has become common to use a riser pipe assembly between a drill base located on the floor of the body of water and the opening in the drilling vessel below the rotary table. Such an assemblage is shown for example in U.S. Pat. 3,177,954. An earlier version was described in simpler form in U.S. Pat. 2,606,003. In using such equipment on any large body of water, such as the ocean, it is apparent that one must provide for a change in depth of the body of water due to tides, swells, and the like. In order to accommodate this, it has become quite customary to use a slip joint so that the riser pipe essentially consists of two telescoping pipes with a permissive variation in length of the order of 20 to 50 feet or so. The sea exerts pressure on the outside of this slip joint. Drilling fluid, ordinarily at a considerably higher pressure, is present within the riser pipe, and accordingly, there is a tendency for this drilling fluid to leak out past the slip joint even though from the start it was customary to provide one or more seals to minimize such leakage. Since in practice there are essentially always many inequalities on the mating cylindrical surfaces of the pipe and the seal, it is necessary to use flexible packing in this seal and some method to insure adequate pressure being exerted on the packing material. Ordinarily, such seals are maintained under a high and essentially constant pressure which causes the seal to wear rapidly, and accordingly, to be a source of leakage. Actually, it is desirable to have the energizing pressure on the sealing member only slightly above the pressure differential existing between the inside and the outside of the riser pipe assemblage. The greater the axial length of the sealing member the less the excess in pressure needs to be. For example, if effective axial length of the seal is of the order of a foot or more, it is possible to maintain effective sealing with the pressure exerted across the sealing member being about one percent or so above the pressure differential forcing liquid axially through the seal. However, the pressure within the riser pipe assembly can vary widely in the various stages of drilling, and as a result, unless the seal pressure can be adjusted proportionately to the differential pressure between the drilling mud and the surrounding water, a pressure adequate for some circumstances will permit leakage under greater pressures, whereas a high seal pressure will cause excessive wear. Frequently the seal in the slip joint is at such a depth that maintenance must be carried on by divers or the drilling program is subject to delay.

DESCRIPTION OF THE PRIOR ART

As mentioned briefly above, it has been conventional in the past in these slip joint seals to provide fixed pressure against the sealing member. One approach which has been frequently used is to follow the packing by a pressure ring against which suitable radially aligned bolts are tightened to urge the packing or sealing member against the surface to be sealed, i.e., the member which reciprocates with respect to the seal. This, of course, provides a maximum pressure initially, which pressure decreases with time and wear of the seal and requires considerable maintenance and frequent replacement.

Another arrangement which has been provided makes the sealing member in a form of a hollow, tube-like member, one surface of which bears against the moving member to be sealed. Pressure communication is established through a flexible conduit between the inside of the hollow member and the vessel, and a fixed hydraulic pressure is maintained inside the sealing member. This suffers much the same disadvantages in terms of rapid wear at constant pressure, and also has the difficulty that if there is a rupture in the pressure line to the vessel, the seal is rendered ineffective.

SUMMARY OF THE INVENTION

The self-energizing seal which forms the subject of this invention consists essentially of a housing, a cylindrical sealing member within the housing bearing against the cylindrical body which the seal encloses, and a means within the housing and outside of the sealing member to apply radial stress inwardly to the sealing member. The sealing member at and adjacent the cylindrical body which it fits is composed of a yielding solid substance, preferably an elastomer or the like. The part of the sealing member adjacent the outer radius is also of a yielding solid substance. The material between these inner and outer portions is of a cylindrical orthotropic material, which has greater stiffness in the radial direction than circumferentially. Put another way, a circumferential stress applied to this material produces a greater strain than would be found if the stress were applied in the radial direction.

The housing preferably has inner side walls which are at least approximately parallel and perpendicular to the axis of the cylindrical body to which the seal fits. Ordinarily the fluid which is to be sealed off is applied in the spacing in the housing outside of the sealing member, which thus automatically transfers radial force due to this fluid inwardly against the sealing member.

It is apparent that other types of self-energizing seals can be devised in accordance with the principles set forth in the following specification and are therefore to be considered as part of this invention.

DESCRIPTION OF THE PREFERRED EMBODIMENTS

Figure 1:
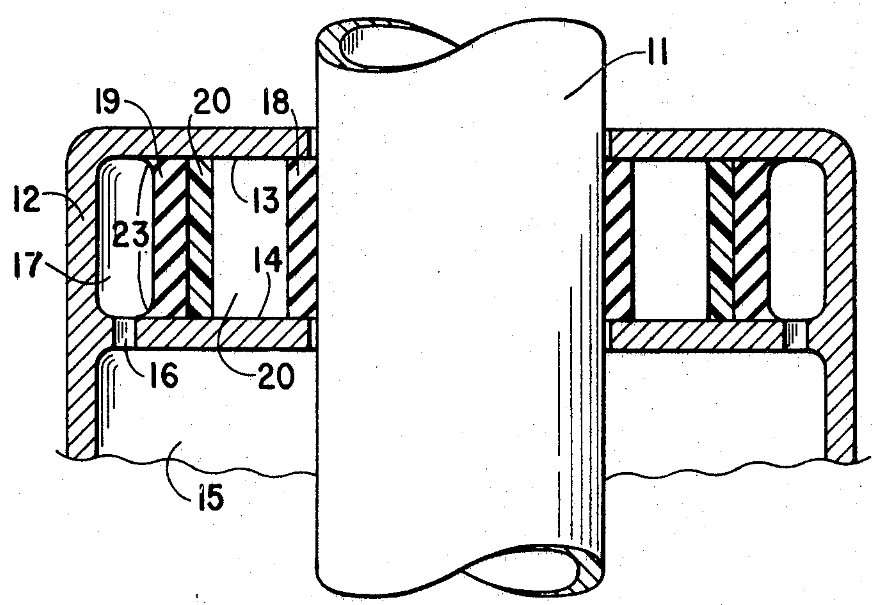
FIG. 1 shows in diagrammatic cross section a self-energizing seal in accordance with this invention.
Figure 2:
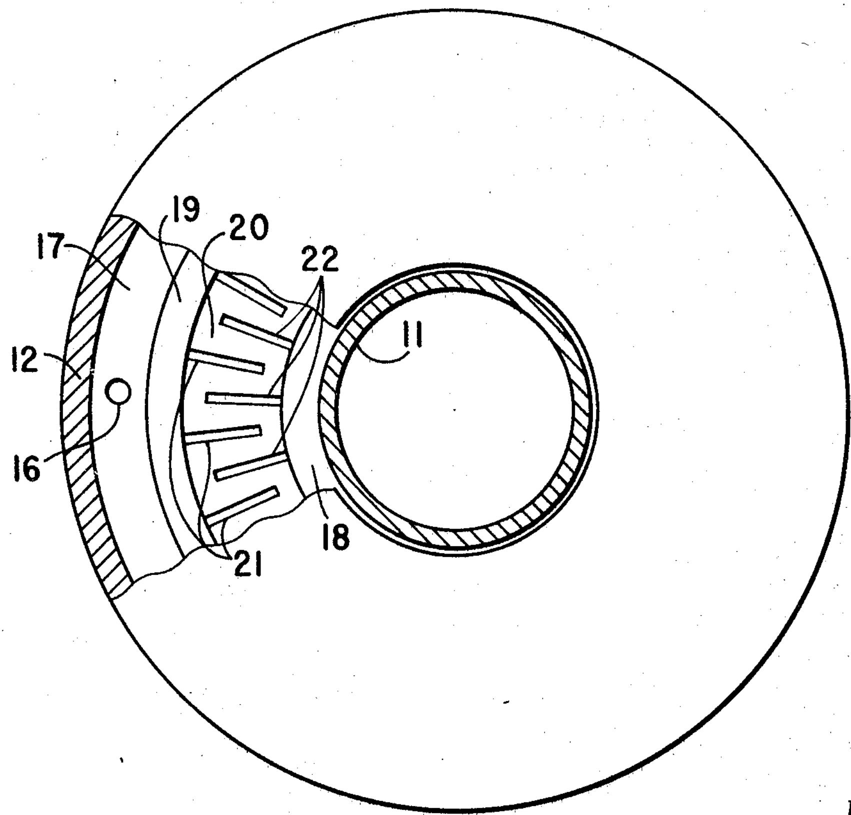
FIG. 2 shows a plan view partly in cutaway illustrating one embodiment.

Referring now to FIG. 1, a pipe or shaft 11, cylindrical in cross section, is shown in FIGS. 1 and 2 as the body which the seal encloses. Surrounding this body is a housing 12 with at least approximately plane parallel sides 13 and 14 which are perpendicular to the axis of member 11. Adjacent this part of the housing is a chamber 15 containing the fluid which is to be sealed against escaping axially along the surface of body 11. One or more parts 16 admit fluid to a chamber 17 extending around the outer part of the housing 12.

The sealing member in this embodiment of the invention is made up of three parts. There is an inner band 18 adjacent body 11 and closely fitting this body. This band is made of a yielding solid substance which can be leather or equivalent, but which is preferably an elastomer, such as rubber, Thiakol (an oil-resistant elastomer), or the like. There is an outer band 19 which similarly is made of a yielding solid substance and which preferably is made of the same material as that of band 18. Between these two bands is a generally cylindrical member, or set of members 20, which transmits radial force applied inwardly on band 19 to band 18.

I have found that if this intermediate part of the cylindrical sealing member (which in these two illustrations comprise elements 18, 19, and 20) has the property of being cylindrically orthotropic, such that it is stiffer in the radial direction than in the circumference direction, the pressure which is applied radially inward by band 18 against body 11 exceeds the radial pressure applied inwardly on band 19 and is directly proportional to that radial stress. Thus the pressure applied in chamber 17 is automatically multiplied and a proportionately greater radial stress is applied to band 18. This insures that the sealing pressure applied by this band is always greater than the pressure applied in chamber 15 so that without attention of the operator or without special outside means, the seal is always self-energizing.

It must be emphasized that if the material intermediate the inner and outermost portions of the cylindrical sealing member is not composed of material having this property, pressure multiplication of any significant amount is not accomplished in a cylindrical seal of economic dimensions. In the particular seal shown in FIGS. 1 and 2, this mid member 20 is made by cutting alternate slots 21 and 22 from one radial surface nearly to the other. This permits this material when assembled in a ring as shown to have considerably greater stiffness in the radial direction than in the circumferential direction. The solid material between the slots acts, in effect, as a set of radially oriented push rods transmitting radial force due to the fluid in chamber 17 acting on band 19 to the inner band 18, and thus automatically proportionately increasing the pressure applied by the inner band 18 against member 11. It is apparent from this discussion that all three parts of the cylindrical seal member 18, 19, and 20 must be yielding solid substances. If band 19 or 18 were relatively incompressible, they would withstand the radial force without radially inward strain, and there would be no pressure multiplication effect against the cylindrical body 11. Likewise, if the midmember 20 had inner and outer radii which were essentially the same dimension or near it, there would be very little, if any, pressure multiplication.

The greater the length of the push rods 20 compared to the radial dimensions of the inner and outer bands 18 and 19, the greater will be the pressure multiplication effect. I prefer to have the radial length of this intermediate section be at least three times the radial thickness of either band 18 or band 19. If these radially oriented symmetrically disposed members 20 are of plastic or metal, it will be found that the radial stiffness of the members will be several times that of the inner and outer bands 18 and 19. This permits accommodation of the outer seal to the chamber 17 with minimal leakage and the similar accommodation of the inner band 18 against the member 11 to which the seal is made. The radial stiffness of the said members should be at least twice that of the inner or outer band. In this case and with the dimensions given, there will always be substantial pressure multiplication against member 11 by the sealing member as compared to the pressure in the outer chamber 17.

It should also be borne in mind that other arrangements for applying radial stress against the outer band 19 can be provided. For example, a metal band of adjustable diameter (rather like a brake drum) can be provided which will apply radial stress to band 19. The hyraulic embodiment shown is simply the most convenient I have found.

A mathematical analysis of a seal of this type indicates that the application of plane stress to a cylindrical band of rubber or similar elastomer surrounding a steel shaft, such as band 18 surrounds body 11, the inner and outer radii of this band being essentially the same (as shown in FIGS. 1 and 2) causes the radial pressure applied to the outer face of this band to be transmitted essentially unchanged to the inner surface of this band bearing against member 11. In fact, if this band were made exceedingly thick in a radial direction, the pressure inside would be only about 30% greater than the radial stress applied inwardly on the outer surface. Similarly, such analysis in the case of plane strain, i.e., with hydrostatic stress applied to the outer and to the end surfaces of such a band, the inside pressure against body 11 would be essentially the same stress.

Figure 9:
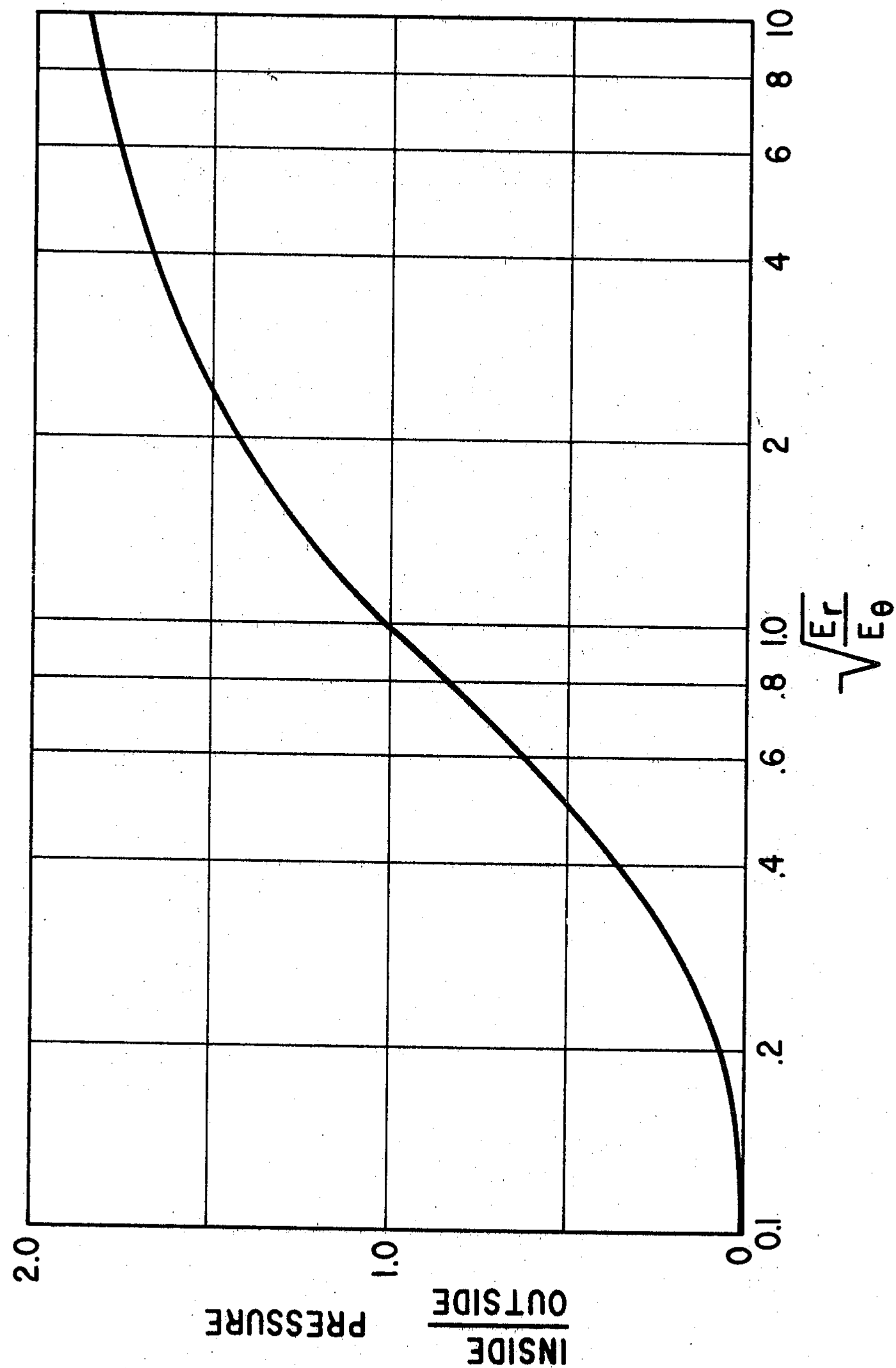
FIG. 9 is a chart showing certain pressure relationships existing in seals of the type of my invention.

When the entire cylindrical sealing member is provided with a midmember having the cylindrical orthotropic property of being stiffer in the radial direction than in the circumferential direction, there is pressure multiplication. One example of this is shown in the graph of FIG. 9 in which the ratio of inside pressure exerted by band 18 against body 11 to the raidal pressure exerted inwardly by band 19 against midmember 20 has been plotted vertically against the square root of the gross elasticity in the radial direction to the gross elasticity in the circumferential direction. For a sealing member which is an elastomer having a Poisson's ratio of 1/2 and a ratio of outer to inner radius of 2, it is seen that when the stiffness in the radial direction exceeds that in the circumferential direction, that is for values of $\sqrt{E_r/E_\theta}$ greater than 1, there is an increased pressure of radial stress of the inner band 18 on body 11 compared to the pressure on band 19 due to the fluid in chamber 17. If the sealing member has a lower ratio of outer to inner radius of less than 2, the vertical scale (relative to the value 1.0) is reduced. For example, in FIG. 9 it is seen that the ratio of pressures, i.e., pressure multiplication, for a value of $\sqrt{E_r/E_\theta}$ of 2 will be 1.4. If the ratio of outer to inner radius for such a seal were 1.1, this 40% increase in pressure would be reduced, and the pressure multiplication ratio would be about 1.01.

From a practical standpoint, I find that frequently the ratio of outer to inner radius of the sealing member is of the order of 1.1. I prefer to have the pressure applied by the innermost part of the sealing member against the member to be sealed at least 1% in excess of the pressure which is to be sealed off. Under the conditions given, this preference results in having a ratio of the gross stiffness in the radial direction to that in the circumferential direction in the cylindrical orthotropic material of at least approximately 2.

By gross stiffness I means the ratio of stress to strain in the stated direction with the stress being applied over a considerable part of the seal, i.e., I am considering macroscopic rather than microscopic stiffness in the seal.

Figure 3:
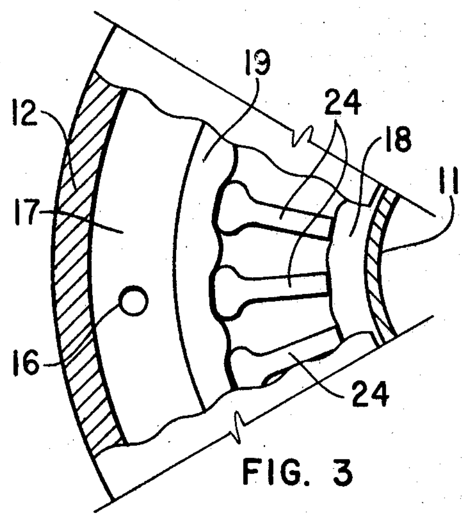
FIGS. 3 and 4 show diagrammatically in cutaway and partial cross section two views of a second embodiment of the invention.
Figure 4:
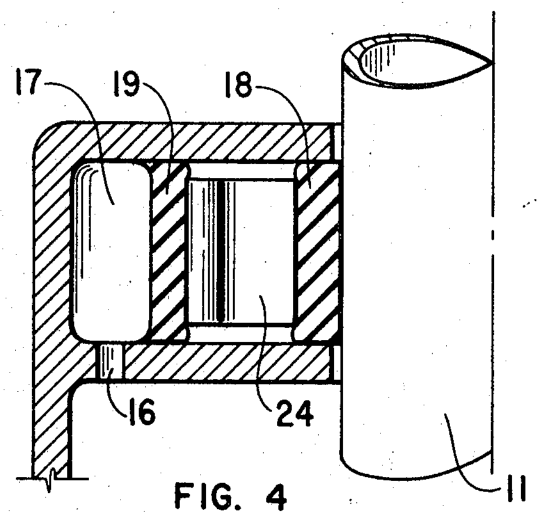

It can readily be understood from this description that there is a number of mechanical arrangements in the cylindrical sealing member which will provide a cylindrical orthotropic effect in the seal. Referring, for example, to FIGS. 3 and 4 which have essentially the same housing as that shown in FIGS. 1 and 2, the cylindrical sealing member is made up of flexible inner and outer bands 18 and 19 between which there are a plurality of radially and symmetrically disposed radially elongated members 24 which might, for example, be made of metal. The shape of these metal push rods, as shown in these figures, involves a greater circumferential area at the outer part (bearing against band 19) than at the inner end (bearing against band 18). These members 24 are essentially plate-like in shape, i.e., they possess two major dimensions and a third which is much less. It is to be noted that these elongated members are each isolated from the others. If this were not so, members 24 could jam against each other upon application of radially inward stress to band 19, in which case the pressure multiplication effect would be minimized. I prefer to have the axial dimension of such members 24 substantially equal to the axial length of the bands 19 and 18, as shown in FIG. 4, or at least not much less.

The gross stiffness in the radial direction of these push rods 24 will be, of course, that of the metal of which they are composed; whereas, the stiffness in the tangential or circumferential direction will be very low, being simply that of the fluid present between the members 24. It is, of course, not essential that the members 24 be of metal. They can be made of other solid materials, for example plastics.

Figure 5:
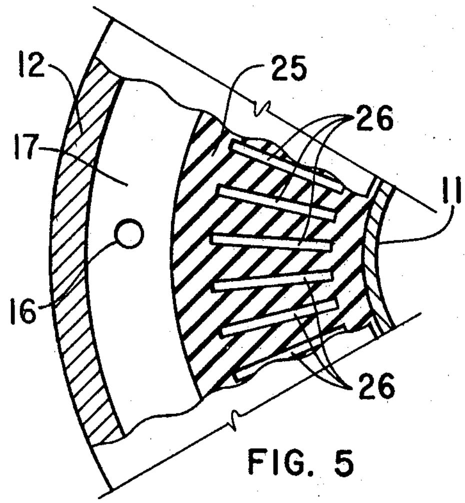
FIG. 5 shows in diagrammatic cutaway plan a third type of cylindrical sealing member which can be used.

Still another way to create a cylindrical orthotropic material in the mid portion of the cylindrical sealing member is to mold into the flexible material or elastomer forming the major body of the sealing member a plurality of rods or plates which are radially and symmetrically disposed therein. An example of this is shown in cross section in FIG. 5. Here the sealing member 25 has had molded into it in the region between the inner and outer radial surfaces a plurality of rods or plates 26 which can be of any solid material that will vulcanize or fasten to the body of the seal and have a radial dimension long compared to that in the circumferential direction or that in the axial dimension, or both. The gross elasticity in the circumferential direction will essentally be that of the elastomer of which most of the sealing member 25 is made; that in the radial direction will be higher since the stiffer rods or plates 26 in this direction bear considerably the stress applied in the radial direction and therefore act as reinforcing rods.

Figure 6:
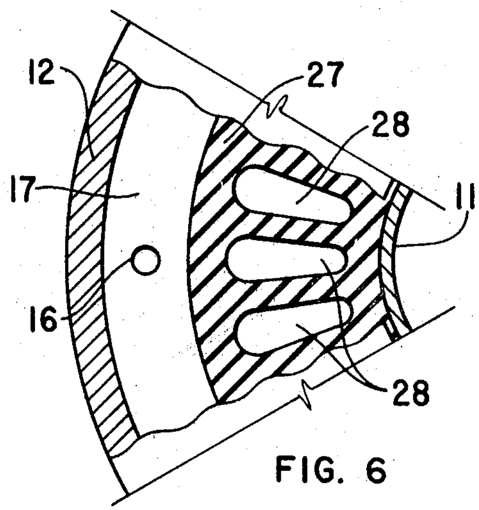
FIGS. 6 and 7 illustrate in diagrammatic cutaway plan and partial cross section still another embodiment.
Figure 7:
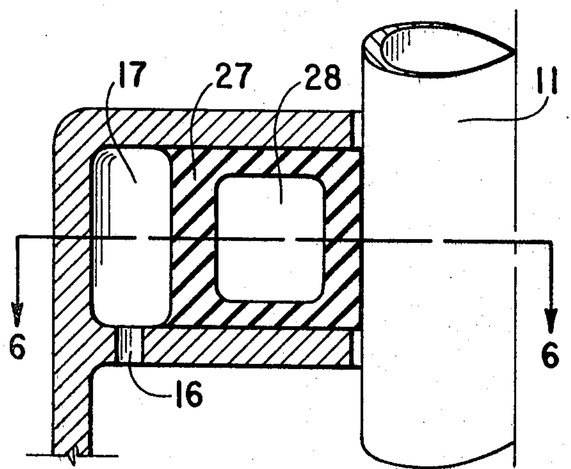

FIGS. 6 and 7 show another alternative type of construction. In this case a decrease in stiffness in the circumferential direction in the region intermediate the inner and outer radius of the cylindrical sealing member 27 is obtained by providing orifices 28 located circumferentially on a uniform basis. As shown in FIG. 7 these orifices 28 penetrate at least the majority of the thickness of the sealing member 27. Such an arrangement provides webs of elastomer between the fluid-filled cavities or orifices 28 which serve to transfer the radially inward force from the outer part of the sealing member 27 to the inner part bearing against the member 11 to be sealed. The circumferential stiffness in the radial direction if such stress be applied across a plurality of these orifices will be close to that of the fluid within the orifices 28; whereas, that in the radial direction will be greater, tending towards that of the elastomer itself.

It is to be noted that in the form of the cylindrical seals shown in FIGS. 1 through 7, the hydraulic pressure on the fluid to be sealed in chamber 16 is applied in chamber 17 against the outer radius of the sealing member. As discussed above, it is desirable to have purely radial stress rather than stress applied along the contact between the seal and the housing. Accordingly, I prefer to provide lips 23 at the outer extremity of the cylindrical sealing member which tend to seal any liquid in chamber 17 against passage between the housing and the sealing member itself.

Figure 8:
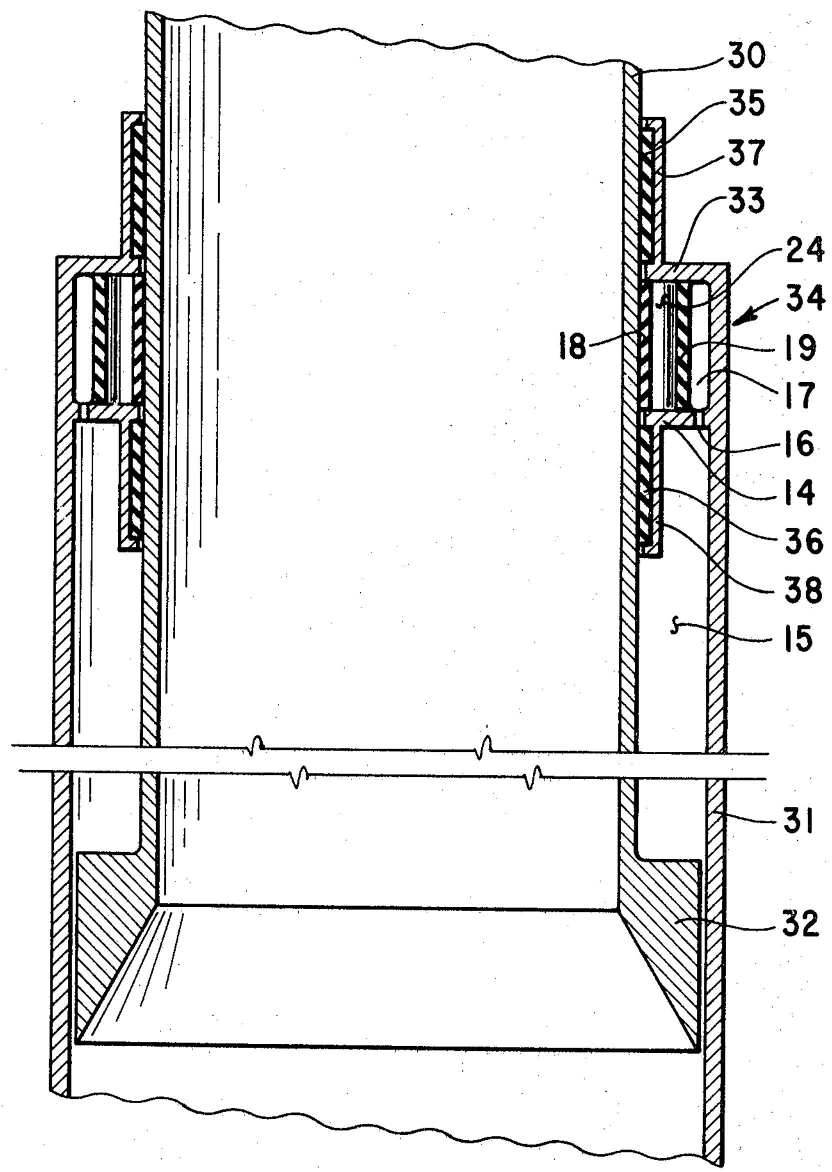
FIG. 8 is a diagrammatic cross section of a slip joint for a riser pipe assemblage in marine drilling, equipped with a self-energizing seal.

In FIG. 8 I have shown one application of such a self-energized cylindrical seal to the slip joint of a riser pipe assembly. The upper part 30 of the slip joint has a smaller diameter than the lower member 31 to afford the conventional telescoping arrangement. Preferably, the bottom of 30 is provided with a shoe 32, the outer diameter of which is just slightly less than that of member 31 so that axial alignment of these two members is obtained. At the upper end 33 of the lower pipe or member 31 I provide a cylindrical self-energizing seal 34 in accordance with my invention. In this embodiment the arrangement of FIGS. 3 and 4 has been employed with an inner elastomer band 18 forced against the outer surface of the upper pipe or member 30, being urged radially inward by the push rods 24 which in turn are urged inwardly by the outer elastomer band 19. Between this elastomer band 19 and the inner wall of lower member 31 is a cavity 17 which communicates through a port 16 in parallel side 14 with the lower chamber 15 which in turn communicates back of shoe 32 with the inside of the riser pipe assembly. With this arrangement, the pressure on the drilling fluid within the riser pipe assembly is exerted on chamber 17. Accordingly, the pressure between the elastomer band 18 and the outer surface of the inner member 30 exceeds that in chamber 15 and there is essentially no leakage of drilling fluid through the slip joint. Port 16 is at the bottom of the seal to avoid drill mud solids lodging in chamber 17.

In the embodiment shown, I have additionally added two pressure pads 35 and 36 which can, for example, also be bands of elastomer supported in close contact against the inner member 30 by surrounding metal housings 37 and 38, which tend to keep the upper ends of members 30 and 31 in alignment so that motion in the slip joint is essentially axially only. This also reduces any tendency to buckling in the slip joint.

I have tested leakage in a self-energizing cylindrical seal of the type shown in FIG. 8 without any of the pressure pads. The pressure differential between the liquid in chamber 15 and that external of the entire seal was approximately 300 p.s.i. The inner radius of band 18 (i.e., outer radius of 30) was 9¾ inches. No leakage of fluid was apparent for a total of over 1⅓ million cycles of reciprocation of the slip joint at an average stroke of 22 inches. This was particularly notable since for test purposes the axial length of the cylindrical sealing member was only one inch; whereas, in a slip joint of the sort shown in FIG. 8 it would normally have an axial length of the order of one foot or more.

It will be apparent that a wide number of modifications and variations may be made without departing from the design criteria of this self-energizing cylindrical seal which has been described. Accordingly, the invention is not to be considered as limited by any specific embodiment but only by the scope of the appended claims.

I claim:

1. A cylindrical seal for minimizing leakage of a fluid between said seal and a cylindrical body said seal encloses, comprising an at least generally cylindrical sealing member with at least approximately plane parallel sides and outer radius substantially greater than the inner radius, said inner radius closely fitting said cylindrical body, said sealing member being composed at and near said inner and said outer radius of a yielding solid substance and therebetween of cylindrical orthotropic material stiffer in the radial direction than in the circumferential direction, a confining housing for said sealing member the inner side walls of which closely fit the side walls of said sealing member without contact with said body, and means within said housing and outside said sealing member for applying radial stress inwardly to said sealing member.

2. Apparatus in accordance with claim 1 in which the ratio of the gross stiffness in the radial direction to that in the circumferential direction in at least the majority of the cylindrical orthotropic material of said sealing member is at least 2.

3. Apparatus in accordance with claim 2 in which said cylindrical orthotropic material includes a plurality of radially and symmetrically disposed radially elongated members, the stiffness of which exceeds that of the balance of said sealing member; said elongated members being each isolated from the others.

4. Apparatus in accordance with claim 3 in which said radially elongated members are essentially plates, the axial length of which at least approaches the axial length of said sealing member.

5. Apparatus in accordance with claim 3 in which said radially elongated members are rods.

6. Apparatus in accordance with claim 3 in which said means for applying radial stress to said sealing member and said housing are so arranged as to apply hydraulic pressure to said sealing member at uniform radial stress.

7. Apparatus as defined in any one of claims 3, 4, and 5 in which at least said yielding solid substance is of an elastomer.

8. Apparatus as defined in any one of claims 3, 4, and 5 in which said sealing member except for said radially elongated members is made of an elastomer.

9. Apparatus in accordance with claim 8 in which said radially elongated members are molded in said elastomer.

10. Apparatus in accordance with claim 1 in which said sealing member is made of an elastomer and in which said sealing member defines a plurality of orifices penetrating at least the majority of the thickness of said sealing member, said orifices being circumferentially uniformly located between the inner and outer radius of said sealing member.

11. Apparatus in accordance with claim 1 in which said sealing member is made up of an inner and an outer band of an elastomer separated by a plurality of radially oriented symmetrically disposed members, each spaced apart from the others, the radial length of said members being at least three times the radial thickness of either said inner or said outer band and the radial stiffness of said members being at least twice that of said inner or said outer band.

References Cited

UNITED STATES PATENTS

| | | | |
|---|---|---|---|
| 1,977,081 | 10/1934 | Olsen | 277—70 X |
| 2,071,914 | 2/1937 | Bentley | 277—27 |
| 2,420,040 | 5/1947 | Frisby et al. | 277—40 |

SAMUEL ROTHBERG, Primary Examiner

U.S. Cl. X.R.

277—71, 235